United States Patent
Vandanapu

(10) Patent No.: US 10,088,330 B2
(45) Date of Patent: Oct. 2, 2018

(54) NAVIGATION SYSTEM WITH NOTIFICATION MECHANISM AND METHOD OF OPERATION THEREOF

(71) Applicant: Telenav, Inc., Santa Clara, CA (US)

(72) Inventor: Naveen Kumar Vandanapu, Sunnyvale, CA (US)

(73) Assignee: Telenav, Inc., Santa Clara, CA (US)

( * ) Notice: Subject to any disclaimer, the term of this patent is extended or adjusted under 35 U.S.C. 154(b) by 26 days.

(21) Appl. No.: 15/153,197

(22) Filed: May 12, 2016

(65) Prior Publication Data

US 2017/0328732 A1    Nov. 16, 2017

(51) Int. Cl.

| G01C 21/36 | (2006.01) |
|---|---|
| G01C 21/34 | (2006.01) |
| B60N 2/00 | (2006.01) |
| G07B 15/06 | (2011.01) |

(52) U.S. Cl.
CPC ......... *G01C 21/3658* (2013.01); *B60N 2/002* (2013.01); *G01C 21/3438* (2013.01); *G01C 21/3676* (2013.01); *G01C 21/3691* (2013.01); *G01C 21/3697* (2013.01); *G07B 15/063* (2013.01)

(58) Field of Classification Search
CPC .......... G01C 21/3658; G01C 21/34; G01C 21/3602; G01C 21/3617; G01C 21/3629; B60K 35/00; G08G 1/096827; G08G 1/096844; G09B 29/007; G09B 29/10
USPC ............... 701/36, 400, 410, 461, 532, 533; 345/204, 214; 324/649; 348/77
See application file for complete search history.

(56) References Cited

U.S. PATENT DOCUMENTS

| 2004/0233186 A1* | 11/2004 | Kobayashi | B60K 35/00 345/204 |
|---|---|---|---|
| 2006/0235324 A1 | 11/2006 | Bruelle-Drews | |
| 2009/0058845 A1* | 3/2009 | Fukuda | B60K 35/00 345/214 |
| 2009/0082951 A1* | 3/2009 | Graessley | G01C 21/3602 701/532 |
| 2009/0248244 A1* | 10/2009 | Sumimoto | B60H 1/00735 701/36 |
| 2011/0084707 A1* | 4/2011 | Nakayama | G01C 21/3664 324/649 |
| 2011/0231088 A1* | 9/2011 | Nishibashi | G01C 21/3658 701/533 |
| 2011/0238298 A1* | 9/2011 | Machino | G01C 21/3461 701/533 |
| 2012/0259539 A1* | 10/2012 | Sumizawa | G01C 21/3658 701/400 |
| 2013/0076881 A1* | 3/2013 | Takahashi | G06K 9/00268 348/77 |

(Continued)

*Primary Examiner* — Anne M Antonucci
*Assistant Examiner* — Sanjeev Malhotra
(74) *Attorney, Agent, or Firm* — Perspectives Law Group, Corp.

(57) ABSTRACT

A method of operation of a navigation system includes: determining an occupancy status with a capturing sensor based on detecting a passenger presence in real time; determining a lane availability of a lane type based on a current location; generating an access notification based on the occupancy status, the lane availability for traversing on the lane type; and updating the access notification with a control unit dynamically and in real time based on a change in the occupancy status, the lane availability, or a combination thereof for presenting on a device.

20 Claims, 7 Drawing Sheets

(56) References Cited

U.S. PATENT DOCUMENTS

| | | | |
|---|---|---|---|
| 2013/0110394 A1* | 5/2013 | Irie | G01C 21/3658 |
| | | | 701/461 |
| 2014/0032098 A1 | 1/2014 | Anderson | |
| 2014/0343837 A1* | 11/2014 | Nishibashi | G01C 21/3658 |
| | | | 701/410 |
| 2016/0216130 A1* | 7/2016 | Abramson | G01C 21/3626 |
| 2017/0076600 A1* | 3/2017 | Scofield | G08G 1/0112 |

* cited by examiner

NAVIGATION SYSTEM WITH NOTIFICATION MECHANISM AND METHOD OF OPERATION THEREOF

TECHNICAL FIELD

The present invention relates generally to a navigation system, and more particularly to a system with notification mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "physical world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without notification mechanism has become a paramount concern for the consumer. The inability decreases the benefit of using the tool.

Thus, a need still remains for a navigation system with notification mechanism. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: determining an occupancy status with a capturing sensor based on detecting a passenger presence in real time; determining a lane availability of a lane type based on a current location; generating an access notification based on the occupancy status, the lane availability for traversing on the lane type; and updating the access notification with a control unit dynamically and in real time based on a change in the occupancy status, the lane availability, or a combination thereof for presenting on a device.

The present invention provides a navigation system, including: a control unit for: determining an occupancy status with a capturing sensor based on detecting a passenger presence in real time; determining a lane availability of a lane type based on a current location; generating an access notification based on the occupancy status, the lane availability for traversing on the lane type; updating the access notification with a control unit dynamically and in real time based on a change in the occupancy status, the lane availability, or a combination thereof; and a communication unit, coupled to the control unit, for transmitting the access notification for presenting on a device.

The present invention provides a navigation system including a non-transitory computer readable medium including instructions for execution, the instructions comprising: determining an occupancy status based on detecting a passenger presence in real time; determining a lane availability of a lane type based on a current location; generating an access notification based on the occupancy status, the lane availability for traversing on the lane type; and updating the access notification dynamically and in real time based on a change in the occupancy status, the lane availability, or a combination thereof for presenting on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
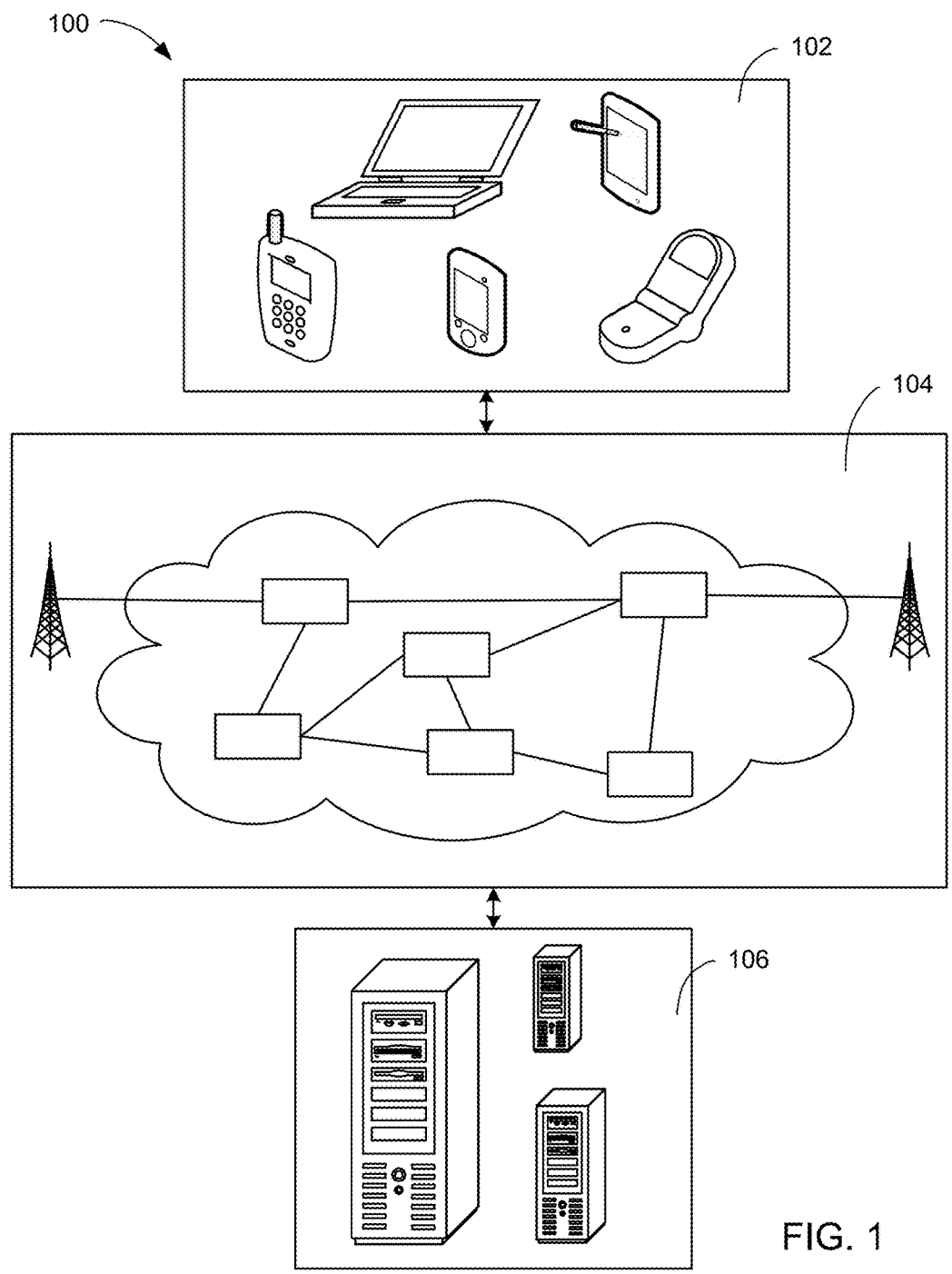
FIG. 1 is a navigation system with notification mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system 100 are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with notification mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle as a head unit, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
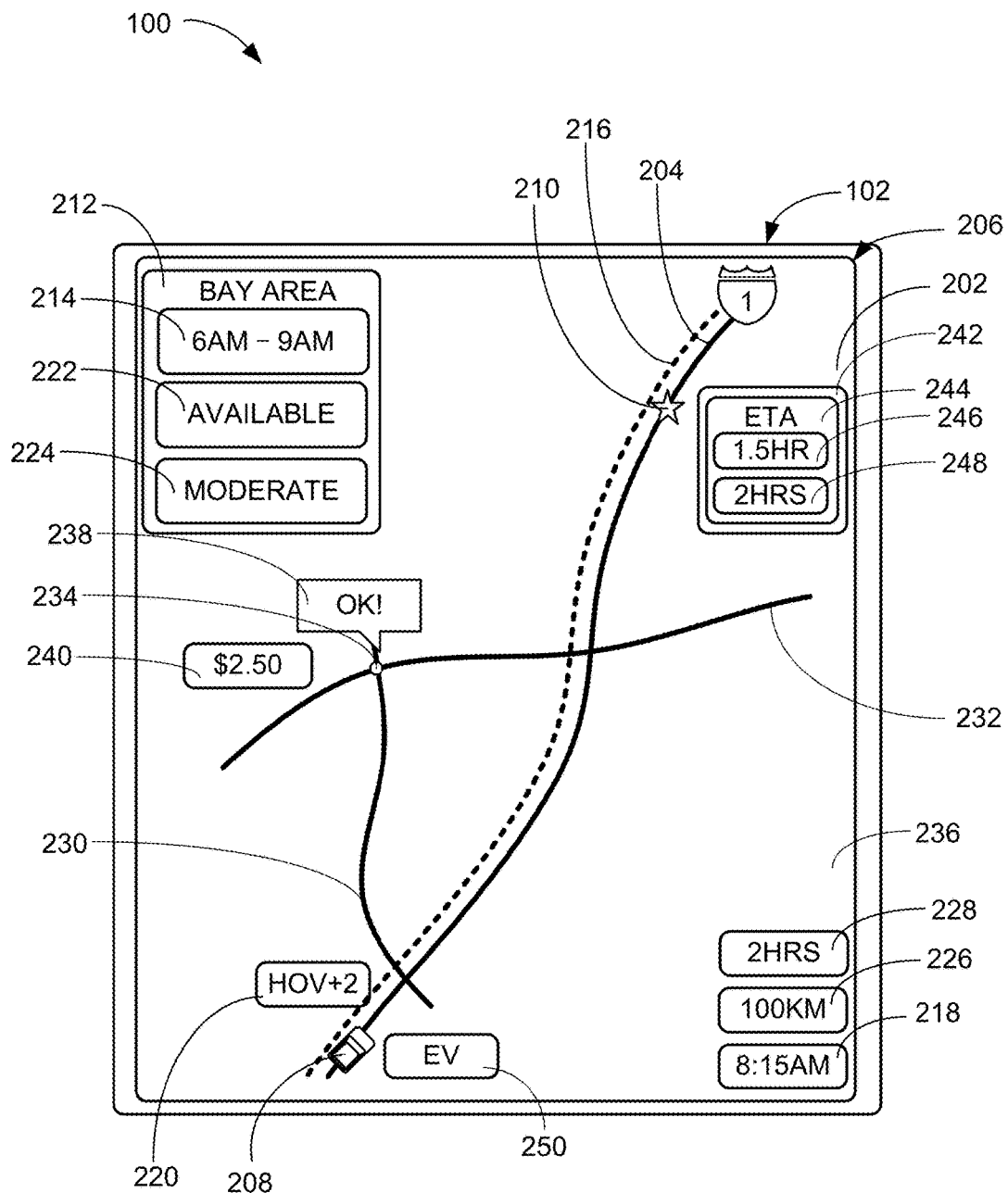
FIG. 2 is an example of a geographic area.

Referring now to FIG. 2, therein is shown an example of a geographic area 202. For clarity and brevity, the discussion of the embodiment of the present invention focuses on the first device 102 delivering the result generated by the navigation system 100. However, various embodiments of the present invention can easily be applied with the description with the second device 106 of FIG. 1 and the first device 102 interchangeably. More specifically as an example, the components of the first device 102 and the second device 106 can be discussed interchangeably.

The geographic area 202 is defined as a digital representation of the physical world. For example, the geographic area 202 can include a thoroughfare 204 connecting one geographic location to another geographic location. The thoroughfare 204 is defined as a path between geographic locations. For example, the thoroughfare 204 can include a local road, a dirt path, an arterial road, an expressway, a freeway, a highway, or a combination thereof. A display interface 206 of the first device 102 can display the geographic area 202.

A current location 208 is defined as a digital representation of the physical location of the first device 102. For example, the current location 208 can represent the physical location of where the user with the first device 102 is currently in the geographic area 202. A waypoint 210 is defined as a digital representation of the physical location. For example, the waypoint 210 can represent a target destination where the user ends his or her travel. For another example, the waypoint 210 can represent the geographic location of a point of interest. The point of interest can represent an entity that is public, private, or a combination thereof such as commercial shop, government building, or a combination thereof.

A travel information 212 is defined as an attribute of the geographic area 202. For example, the travel information 212 can represent the detail regarding the geographic area 202. For a specific example, the travel information 212 can include the name of the thoroughfare 204 passing through the geographic area 202. For another example, the travel information 212 can include a time restriction 214 placed on a lane type 216 of the thoroughfare 204 during certain instance of a time information 218.

The lane type 216 is defined as a classification of lane. For example, the lane type 216 can include high-occupancy vehicle (HOV) lane. The HOV lane can represent the lane type 216 that requires certain number of passengers to use the lane without incurring a financial cost. For another example, the HOV lane can also be used with electronic payment device installed on the vehicle that automatically deducts financial cost from using the lane even though the vehicle does not meet the required number of passengers. For a different example, the lane type 216 can include non-HOV lane including a commercial vehicle lane, a bus lane, a bicycle lane, a pedestrian lane, a lane with toll, or a combination thereof.

A government law 220 can set the minimum number of passengers required to use the HOV lane. The government law 220 is defined as regulation set by the government. The government law can include local law, county law, province law, state law, prefecture law, country law, federal law, national law, or a combination thereof.

A time restriction 214 is a time limit placed on the lane type 216. For example, the time restriction 214 can be placed on the HOV lane for a usage with minimum number of passengers between the time information 218 of 6 AM to 9 AM. In contrast, the time restriction 214 may not be placed between the hours after 9 AM until before 6 AM for the HOV lane, thus, turning the lane type 216 into non-HOV lane. The time information 218 can represent a time of day, week, month, year, season, or a combination thereof.

A lane availability 222 is a state of being able to use the lane type 216. For example, the lane availability 222 of the HOV lane without incurring financial cost can represent from the hours after 9 AM until before 6 AM.

A traffic condition 224 is defined as a state of traffic flow. For example, the traffic condition 224 can include no traffic, moderate traffic, heavy traffic, standstill, or a combination thereof. Standstill can represent the traffic condition 224 where the speed of the vehicle is at zero kilometers per hour. No traffic can represent the traffic condition 224 where the speed of the vehicle is at the speed limit or above.

The traffic condition 224 can be determined based on a travel distance 226 within a travel duration 228. Each instance of the traffic condition 224 can include a traffic threshold. If the travel distance 226 within the travel duration 228 is below the traffic threshold, the navigation system 100 can determine the traffic condition 224 of either no traffic, moderate traffic, heavy traffic, standstill, or a combination thereof.

The travel distance 226 is the physical distance traveled. For example, the travel distance 226 from the current location 208 to the waypoint 210 can represent 100 kilometers. The travel duration 228 is defined as a time taken for travel. For example, the travel duration 228 from the current location 208 to the waypoint 210 can represent 2 hours.

The navigation system 100 can generate a travel route 230, a ride share route 232, or a combination thereof. The travel route 230 is defined as a path from the current location 208 to the waypoint 210. For example, the travel route 230 can represent the path directly from the current location 208 to the waypoint 210 without stopping by a pickup location 234 to pick up another passenger. The travel route 230 can include the thoroughfare 204 with the lane type 216 of the HOV lane or exclude the lane type 216 of the HOV lane.

The ride share route 232 is defined as a path that stops by the pickup location 234 prior to reaching the waypoint 210. The pickup location 234 is defined as the geographic location where the user picks up another passenger. For example, the user can pick up another passenger at the pickup location 234 to meet the number of passengers required to use the HOV lane. For a specific example, the ride share route 232 can include instances of the thoroughfare 204 that connects the current location 208, the pickup location 234, the waypoint 210, or a combination thereof. The user can stop by multiple instances of the pickup location 234 prior to reaching the waypoint 210. The waypoint 210 representing the target destination can differ for each passengers in the vehicle.

A ride share request 236 is an act of asking to share a ride. For example, the user or the passenger can transmit the ride share request 236 from the first device 102 to the navigation system 100 to ride on the vehicle. If the user or the driver transmits the ride share request 236 from the first device 102 to a potential passenger with the first device 102 indicating a ride share availability 238 of "available" via the communication path 104 of FIG. 1, the passenger can accept the ride share request 236. As a result, the navigation system 100 can generate the ride share route 232 from the current location 208 to the pickup location 234 to pick up the passenger prior to heading to the waypoint 210.

The ride share availability 238 is a status of availability to share a ride. For example, the driver or the potential passenger can indicate the ride share availability 238 as "available" or "unavailable." The potential passenger can transmit the ride share request 236 to the driver with the ride share availability 238 of "available" to be picked up at the pickup location 234.

A ride share fee 240 is a monetary cost for sharing the ride. For example, the navigation system 100, the user, the passenger, or a combination thereof can charge the user, the passenger, or a combination thereof for sharing the ride.

An arrival estimation 242 is defined as an approximate time to reach the desired geographic location. For example, the navigation system 100 can calculate the arrival estimation 242 for the pickup location 234, the waypoint 210, or a combination thereof. An estimation type 244 is a classification of the arrival estimation 242. For example, the estimation type 244 can include a carpool estimation 246, a single driver estimation 248, or a combination thereof.

The carpool estimation 246 is defined as the arrival estimation 242 for the ride share route 232. For example, the carpool estimation 246 can represent the time information 218 of arriving at the waypoint 210 after stopping by multiple instances of the pickup location 234. The carpool estimation 246 can represent the time information 218 of arriving at the pickup location 234. For a different example, the single driver estimation 248 is defined as the arrival estimation 242 for the travel route 230. For example, the single driver estimation 248 can represent the time information 218 of arriving at the waypoint 210 from the current location 208 without stopping by the pickup location 234. The carpool estimation 246, the single driver estimation 248, or a combination thereof can factor the traversal of the HOV lane.

A vehicle type 250 is defined as a classification of the vehicle. For example, the vehicle type 250 representing an environmental friendly can use the lane type 216 representing the HOV lane without meeting the requirement for a number of passengers. For further example, the vehicle type 250 can include the commercial vehicle, the non-commercial vehicle, or a combination thereof.

Figure 3:
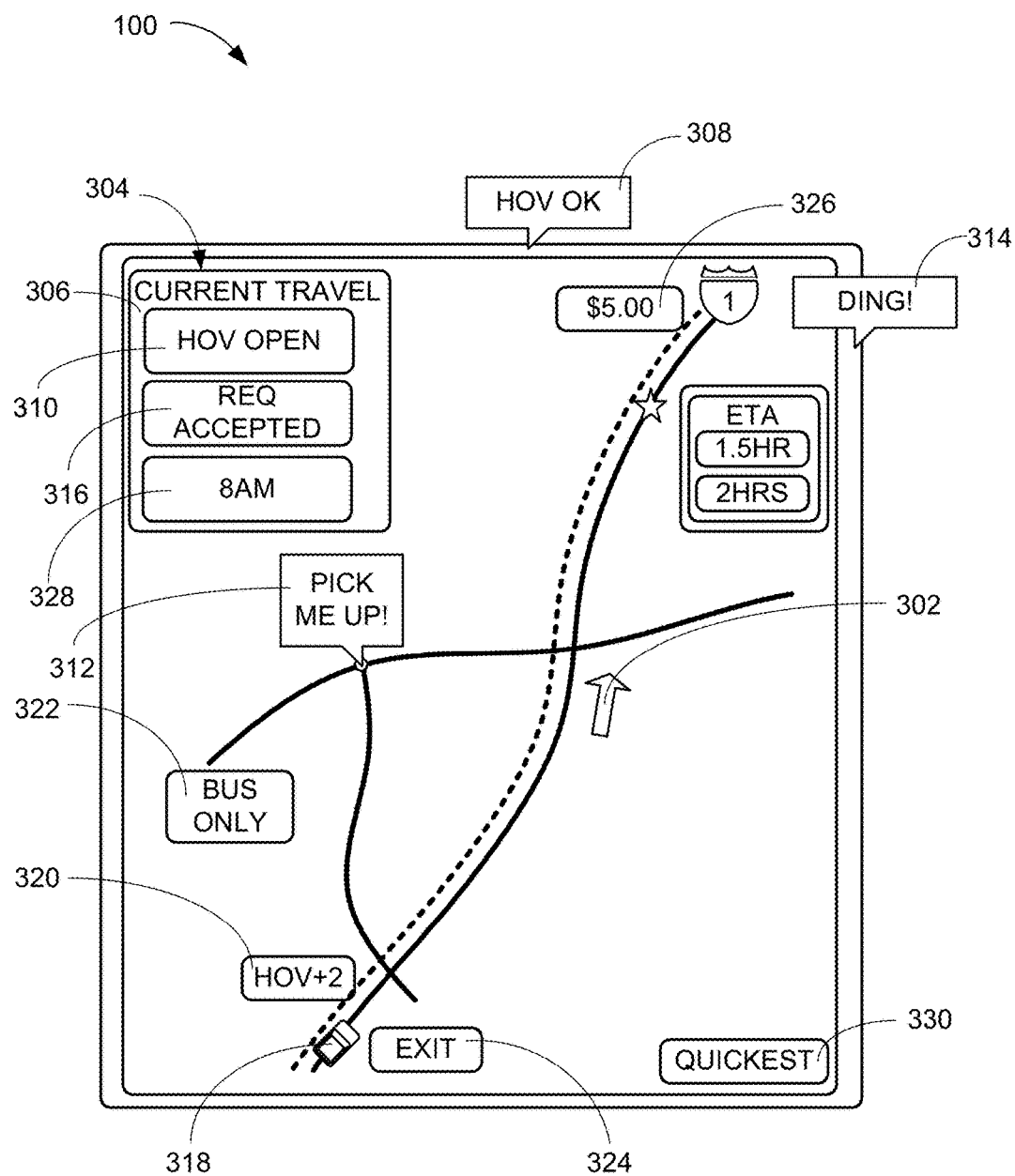
FIG. 3 is an example of a navigation guidance.

Referring now to FIG. 3, therein is shown an example of a navigation guidance 302. The navigation guidance 302 is information presented to aid the travel. For example, the navigation guidance 302 can include the travel route 230 of FIG. 2, the ride share route 232 of FIG. 2, or a combination thereof to aid the user to reach the pickup location 234 of FIG. 2, the waypoint 210 of FIG. 2, or a combination thereof.

The navigation guidance 302 can include an access notification 304, which is defined as an indicator to alert the user. For example, the access notification 304 can include a notice type 306, which is defined as a classification of the access notification 304. For a specific example, the notice type 306 can include an audio notification 308, a visual notification 310, or a combination thereof.

The audio notification 308 is defined as an audible indicator to alert the user. For example, the audio notification 308 can include an audio prompt 312, an audio sound 314, or a combination thereof. The audio prompt 312 is defined an audible message. The audio sound 314 is an audible warning.

The visual notification 310 is defined as a visual indicator to alert the user. For example, the visual notification 310 can include a visual prompt 316, a visual cue 318, or a combination thereof. The visual prompt 316 is defined as a visual message. The visual cue 318 is defined as a visual icon. For example, the visual cue 318 representing the current location 208 can represent a digital image of a vehicle, an arrow, or a combination thereof.

The audio notification 308, the visual notification 310, or a combination thereof can include an HOV notification 320, a commercial vehicle lane notification 322, a lane type notification 324, a toll notification 326, a departure notification 328, or a combination thereof. The HOV notification 320 is defined as the access notification 304 to notify whether the user can use the HOV lane or not. For example, if the lane availability 222 of FIG. 2 of the HOV lane is "available," the navigation system 100 can generate the HOV notification 320 to alert the user that HOV lane can be used for travel.

The commercial vehicle lane notification 322 is defined as the access notification 304 to indicate the user of the lane type 216 available only for commercial vehicle. For example, the commercial vehicle can include a bus, taxi, or a combination thereof. The lane type notification 324 is defined as the access notification 304 to indicate restriction placed on the lane of the thoroughfare 204 of FIG. 2. More specifically as an example, the thoroughfare 204 can include multiple lanes. For example, the left lane of the thoroughfare 204 can be closed for use. The navigation system 100 can generate the lane type notification 324 to notify the closure of the left lane.

The toll notification 326 is defined as the access notification 304 to indicate the monetary cost for traversal. For example, the navigation system 100 can generate the toll notification 326 to indicate a toll fare 332 at the toll plaza, the monetary cost to use the HOV lane, or a combination thereof. The departure notification 328 is defined as the access notification 304 to notify the time information 218 of FIG. 2 for departure. For example, the navigation system 100 can factor the traffic condition 224 of FIG. 2 to suggest the time information 218 in the departure notification 328 for when the user should leave for the travel.

A user preference 330 is defined as user's predilection. For example, the user preference 330 can indicate a choice to use a particular instance of the lane type 216 of FIG. 2. For a specific example, the user preference 330 can indicate the preference for using the HOV lane to save time over saving money. The navigation system 100 can consider the user preference 330 to generate the departure notification 328 to factor the usage of the HOV lane.

For further example, the user preference 330 can define the ride share fee 240 of FIG. 2 to charge for sharing the ride. For additional example, the user preference 330 can define the travel distance 226 of FIG. 2, the travel duration 228 of FIG. 2, or a combination thereof that the user is willing to travel to reach the pickup location 234, the waypoint 210, or a combination thereof.

Figure 4:
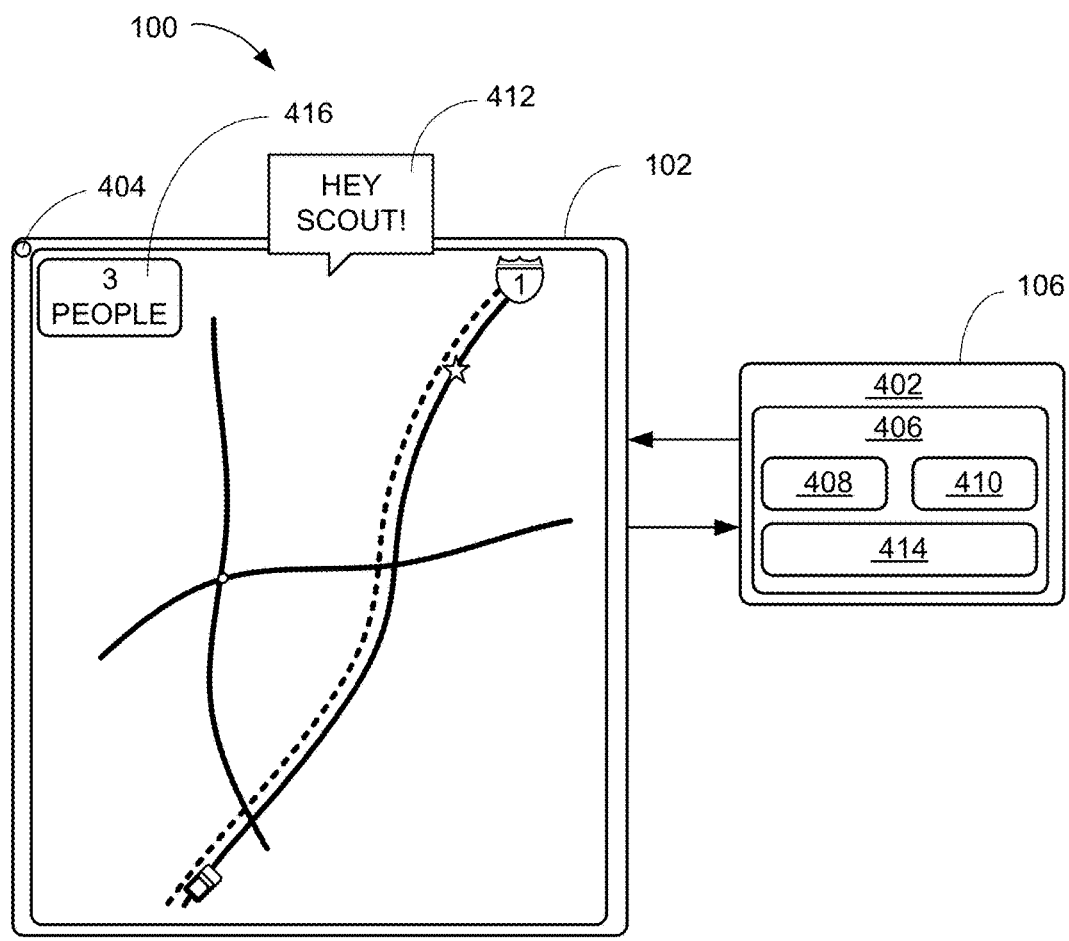
FIG. 4 is an example of a source data.

Referring now to FIG. 4, therein is shown an example of a source data 402. The first device 102 and the second device 106 can transmit the source data 402 between the two devices. The source data 402 is a factor considered by the navigation system 100. For example, the navigation system 100 can consider the source data 402 to generate the access notification 304 of FIG. 3. For further example, the source data 402 can include all the elements discussed in FIG. 2, FIG. 3, or a combination thereof.

For additional example, the navigation system 100 can consider the source data 402 captured by a capturing sensor 404. The capturing sensor 404 is a device to collect information. The examples of the capturing sensor 404 will be discussed below.

The capturing sensor 404 can capture a passenger presence 406. The passenger presence 406 is defined as an existence of a human being. For example, the capturing sensor 404 can capture the passenger presence 406 inside, outside, or a combination thereof of the vehicle.

The passenger presence 406 can include a passenger image 408, a biometric information 410, a passenger voice 412, a vehicle manipulation 414, or a combination thereof. The passenger image 408 is defined as a picture of a human being. For example, the passenger image 408 can represent the digital photograph of the driver, the passenger, or a combination thereof.

The biometric information 410 is defined as information related to vital sign of a human being. For example, the biometric information 410 can include an electrical activity of human's heart, respiratory rate and pattern, pulse, body temperature, body weight, blood pressure, or a combination thereof. The vehicle manipulation 414 is defined an act of interacting with the vehicle. For example, the vehicle manipulation 414 can include manipulating the vehicle's function. The vehicle's function can include the control for power window, steering wheel, passenger seat, seat belt, or a combination thereof.

An occupancy status 416 is defined as a number of passenger. For example, the occupancy status 416 of having the driver alone in the vehicle will be one. For another example, the occupancy status 416 of having the driver and another passenger in the vehicle will be two. The navigation system 100 can compare the occupancy status 416 to the government law 220 of FIG. 2 to determine whether the vehicle can travel on the HOV lane.

Figure 5:
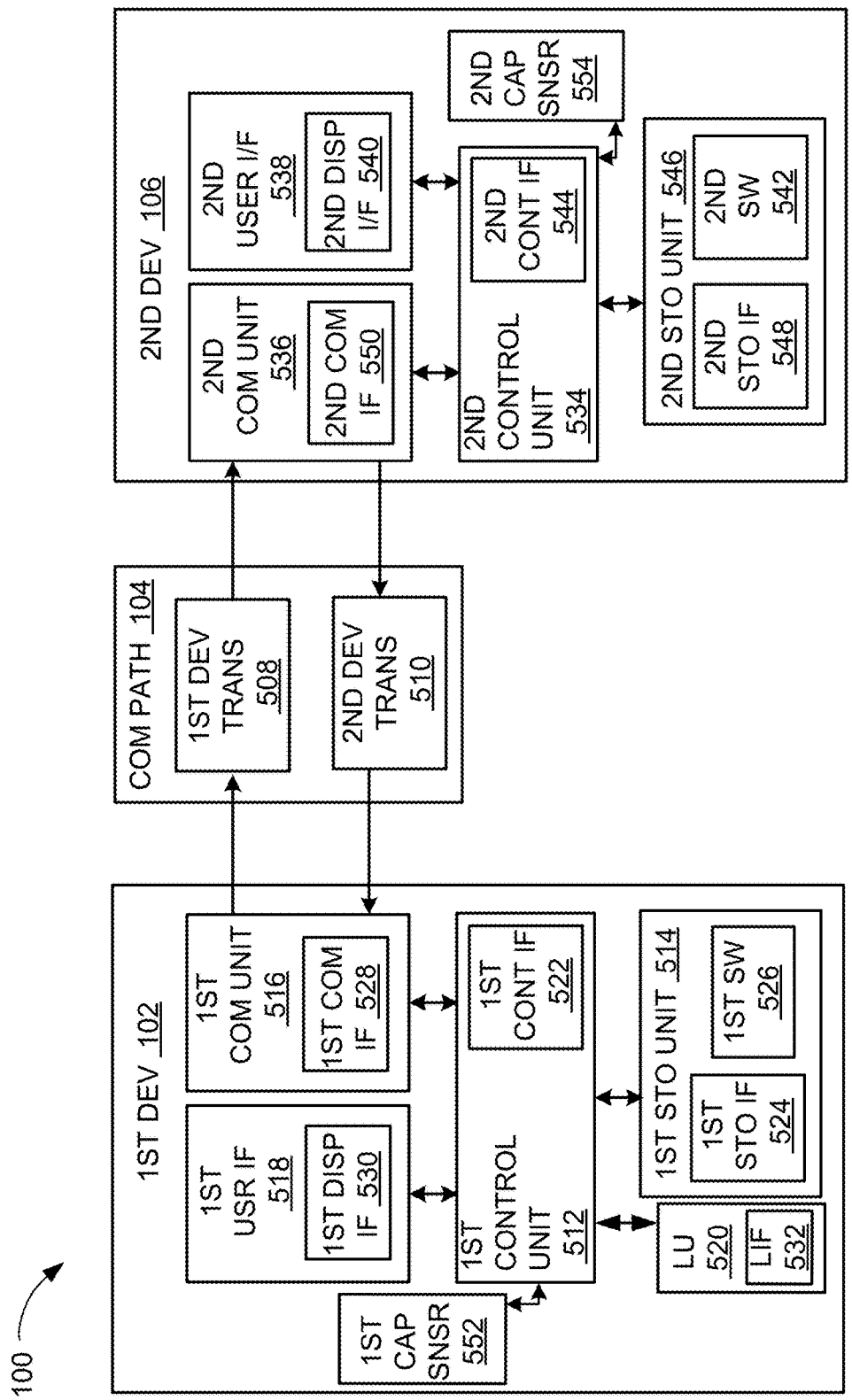
FIG. 5 is an exemplary block diagram of the navigation system.

Referring now to FIG. 5, therein is shown an exemplary block diagram of the navigation system 100. The navigation system 100 can include the first device 102, the communication path 104, and the second device 106. The first device 102 can send information in a first device transmission 508 over the communication path 104 to the second device 106. The second device 106 can send information in a second device transmission 510 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 512, a first storage unit 514, a first communication unit 516, a first user interface 518, and a location unit 520. The first control unit 512 can include a first control interface 522. The first control unit 512 can execute a first software 526 to provide the intelligence of the navigation system 100. The first control unit 512 can be implemented in a number of different manners. For example, the first control unit 512 can be a processor, an embedded processor, a microprocessor, a hardware control logic, a hardware finite state machine (FSM), a digital signal processor (DSP), or a combination thereof. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or to external destinations. The external sources and the external destinations refer to sources and destinations physically separate from the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The location unit 520 can generate location information, current heading, and current speed of the first device 102, as examples. The location unit 520 can be implemented in many ways. For example, the location unit 520 can function as at least a part of a global positioning system (GPS), an inertial navigation system, a cellular-tower location system, a pressure location system, or any combination thereof.

The location unit 520 can include a location interface 532. The location interface 532 can be used for communication between the location unit 520 and other functional units in the first device 102. The location interface 532 can also be used for communication that is external to the first device 102.

The location interface 532 can receive information from the other functional units or from external sources, or can transmit information to the other functional units or to external destinations. The external sources and the external destinations refer to sources and destinations physically separate from the first device 102.

The location interface 532 can include different implementations depending on which functional units or external units are being interfaced with the location unit 520. The location interface 532 can be implemented with technologies and techniques similar to the implementation of the first control interface 522.

The first storage unit 514 can store the first software 526. The first storage unit 514 can also store the relevant information, such as advertisements, points of interest (POI), navigation routing entries, or any combination thereof.

The first storage unit 514 can be a volatile memory, a nonvolatile memory, an internal memory, an external memory, or a combination thereof. For example, the first storage unit 514 can be a nonvolatile storage such as non-volatile random access memory (NVRAM), Flash memory, disk storage, or a volatile storage such as static random access memory (SRAM).

The first storage unit 514 can include a first storage interface 524. The first storage interface 524 can be used for communication between the location unit 520 and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations physically separate from the first device 102.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the first device 102. For example, the first communication unit 516 can permit the first device 102 to communicate with the second device 106, an attachment, such as a peripheral device or a computer desktop, and the communication path 104.

The first communication unit 516 can also function as a communication hub allowing the first device 102 to function as part of the communication path 104 and not limited to be an end point or terminal unit to the communication path 104.

The first communication unit 516 can include active and passive components, such as microelectronics or an antenna, for interaction with the communication path 104.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, or any combination thereof to provide data and communication inputs.

The first user interface 518 can include a first display interface 530. The first display interface 530 can include a display, a projector, a video screen, a speaker, or any combination thereof.

The first control unit 512 can operate the first user interface 518 to display information generated by the navigation system 100. The first control unit 512 can also execute the first software 526 for the other functions of the navigation system 100, including receiving location information from the location unit 520. The first control unit 512 can further execute the first software 526 for interaction with the communication path 104 via the first communication unit 516.

The second device 106 can be optimized for implementing the present invention in a multiple device embodiment with the first device 102. The second device 106 can provide the additional or higher performance processing power compared to the first device 102. The second device 106 can include a second control unit 534, a second communication unit 536, and a second user interface 538.

The second user interface 538 allows a user (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence of the second device 106 of the navigation system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the navigation system 100, including operating the second communication unit 536 to communicate with the first device 102 over the communication path 104.

The second control unit 534 can be implemented in a number of different manners. For example, the second control unit 534 can be a processor, an embedded processor, a microprocessor, a hardware control logic, a hardware finite state machine (FSM), a digital signal processor (DSP), or a combination thereof.

The second control unit 534 can include a second control interface 544. The second control interface 544 can be used for communication between the second control unit 534 and other functional units in the second device 106. The second control interface 544 can also be used for communication that is external to the second device 106.

The second control interface 544 can receive information from the other functional units or from external sources, or can transmit information to the other functional units or to external destinations. The external sources and the external destinations refer to sources and destinations physically separate from the second device 106.

The second control interface 544 can be implemented in different ways and can include different implementations depending on which functional units or external units are being interfaced with the second control interface 544. For example, the second control interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store the relevant information, such as advertisements, points of interest (POI), navigation routing entries, or any combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the navigation system 100 is shown with the second storage unit 546 as a single hierarchy storage system, although it is understood that the navigation system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as non-volatile random access memory (NVRAM), Flash memory, disk storage, or a volatile storage such as static random access memory (SRAM).

The second storage unit 546 can include a second storage interface 548. The second storage interface 548 can be used for communication between the location unit 520 and other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations physically separate from the second device 106.

The second storage interface 548 can include different implementations depending on which functional units or external units are being interfaced with the second storage unit 546. The second storage interface 548 can be implemented with technologies and techniques similar to the implementation of the second control interface 544.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second control interface 544.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The navigation system 100 can be executed by the first control unit 512, the second control unit 534, or a combination thereof.

For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 5 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 520, although it is understood that the second device 106 can also operate the location unit 520.

A first capturing sensor 552 can be the capturing sensor 404 of FIG. 4. Examples of the first capturing sensor 552 can include a digital camera, video camera, thermal camera, night vision camera, infrared camera, x-ray camera, or the combination thereof. Examples of the first capturing sensor 552 can further include accelerometer, thermometer, microphone, wireless signal receiver, remote physiological monitoring device, light identifier, tactile sensor, or the combination thereof.

A second capturing sensor 554 can be the capturing sensor 404. Examples of the second second sensor 554 can include a digital camera, video camera, thermal camera, night vision camera, infrared camera, x-ray camera, or the combination thereof. Examples of the second capturing sensor 554 can further include accelerometer, thermometer, microphone, wireless signal receiver, remote physiological monitoring device, light identifier, tactile sensor, or the combination thereof.

Figure 6:
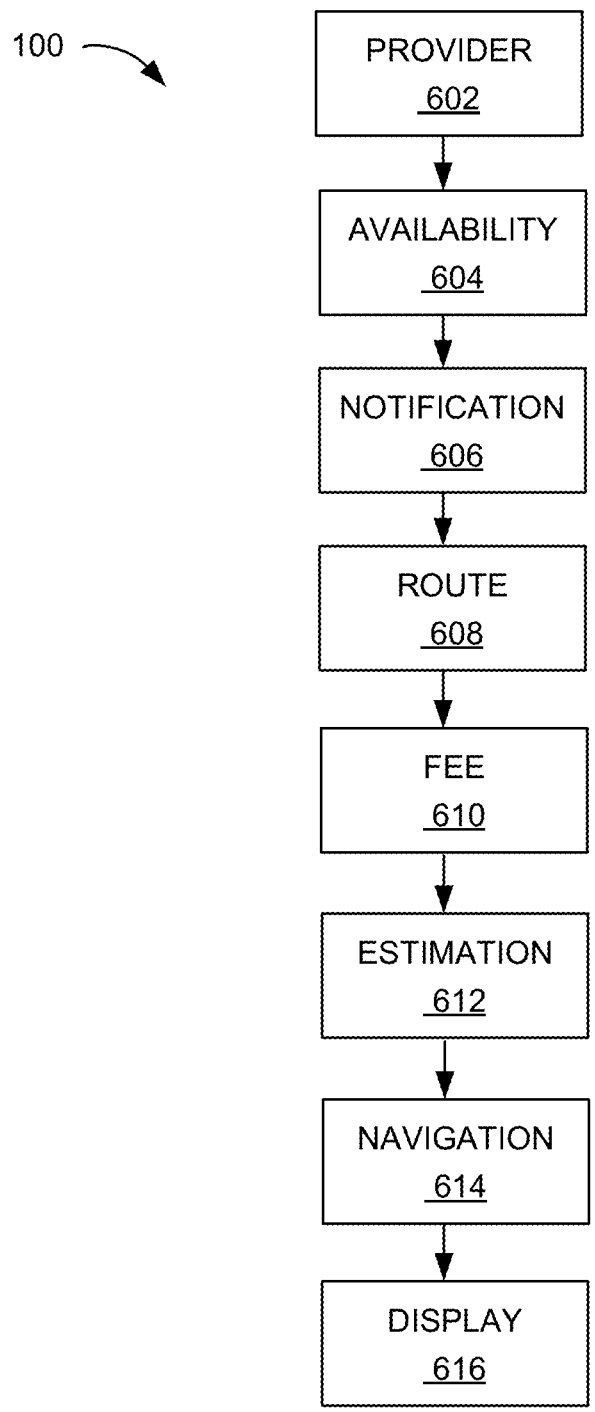
FIG. 6 is a control flow of the navigation system.

Referring now to FIG. 6, therein is shown a control flow of the navigation system 100. The modules discussed below can be executed by the first control unit 512 of FIG. 5, the second control unit 534 of FIG. 5, or a combination thereof. The discussion of the first control unit 512 and the second control unit 534 can be discussed interchangeably. The first control unit 512, the second control unit 534, and the modules can transmit the data via the communication path 104 of FIG. 5. The word "user" and "driver" can be used interchangeably.

The navigation system 100 can include a provider module 602. The provider module 602 determines and provides the source data 402 of FIG. 4 necessary to generate the navigation guidance 302 of FIG. 3. For example, the provider module 602 can determine the source data 402 including the occupancy status 416 of FIG. 4, the vehicle type 250 of FIG. 2, the traffic condition 224 of FIG. 2, the travel information 212 of FIG. 2, or a combination thereof.

The provider module 602 can provide the source data 402 in a number of ways. For example, the provider module 602 can determine the occupancy status 416 based on the passenger presence 406 of FIG. 4. For further example, the passenger presence 406 can include the passenger image 408 of FIG. 4, the biometric information 410 of FIG. 4, the passenger voice 412 of FIG. 4, the vehicle manipulation 414 of FIG. 4, or a combination thereof.

For a specific example, the capturing sensor 404 of FIG. 4 can represent a digital camera, video recorder, or a combination thereof. The vehicle with the navigation system 100 can include the capturing sensor 404. The capturing sensor 404 can constantly monitor the inside, the outside, or a combination thereof of the vehicle to dynamically capture the passenger presence 406 in real time. Real time can represent an actual time during a process or event occurs. Dynamically can represent a constant change, activity, or progress due to change in circumstance or event.

More specifically as an example, the capturing sensor 404 can scan the inside, the outside, or a combination thereof of the vehicle to capture the passenger image 408. The capturing sensor 404 can capture the passenger image 408 including the face or faces of the user, the other passenger, or a combination thereof based on the facial recognition algorithm. The capturing sensor 404 can also capture inanimate object such as a car seat.

For further example, the capturing sensor 404 can transmit the passenger image 408 via the communication path 104 to the second control unit 534 to execute the provider module 602 to update the passenger presence 406 dynamically as the capturing sensor 404 detects the user, the passenger, or a combination thereof in real time. Based on the passenger image 408 captured or not, the provider module 602 can determine the occupancy status 416 of whether there is a passenger besides the user operating the vehicle is present or not in the vehicle.

For a different example, the capturing sensor 404 can represent the physiological monitoring device including a thermometer, a weight scale, an electrocardiography (EKG) device, a respiratory monitoring device, or a combination thereof. The capturing sensor 404 installed on the vehicle can constantly monitor the inside, the outside, or a combination thereof of the vehicle to dynamically to capture the biometric information 410 of the passenger present in the vehicle in real time. More specifically as an example, the capturing sensor 404 can capture the biometric information 410 of the driver, other passengers, or a combination thereof based on the seating arrangement within the vehicle.

More specifically as an example, the capturing sensor 404 can monitor the breathing rate and pattern of the passenger. The capturing sensor 404 can detect the weight of the passenger sitting on the seat. The capturing sensor can track the electrical activity of the human body. The capturing sensor 404 can detect the body temperature sitting on the seat.

For further example, the capturing sensor 404 can transmit the biometric information 410 via the communication path 104 to the second control unit 534 to execute the provider module 602 to update the passenger presence 406 dynamically as the capturing sensor 404 detects the user, the passenger, or a combination thereof in real time. Based on the biometric information 410 captured per seat, the provider module 602 can determine the occupancy status 416 of whether there are more than one passenger within the vehicle.

For another example, the capturing sensor 404 can represent a vehicle sound system including an audio recorder such as a microphone. The capturing sensor 404 installed on the vehicle can constantly monitor the inside, the outside, or a combination thereof to capture multiple instances of the passenger voice 412 including the driver, other passenger, or a combination thereof in real time.

For further example, the capturing sensor 404 can transmit the passenger voice 412 via the communication path 104 to the second control unit 534 to execute the provider module 602 to update the passenger presence 406 dynamically as the capturing sensor 404 detects the user, the passenger, or a combination thereof in real time. Based on the passenger voice 412 captured, the provider module 602 can determine the occupancy status 416 of whether there are more than one passenger within the vehicle.

For another example, the capturing sensor 404 can represent a tactile sensor that can capture the vehicle manipulation 414. The tactile sensor can be included in a power window control, seatbelt, seatbelt buckle, vehicle seat, or a combination thereof. More specifically as an example, the vehicle manipulation 414 can representing the passenger accessing the function of the vehicle including the window control, seatbelt, vehicle seat, or a combination thereof.

For example, the power window control for the side window for the seat other than the driver can be manipulated by the passenger to be raised or lowered for the capturing sensor 404 to identify that there is a passenger other than the driver. The seatbelt for the seat other than the driver can be buckled for the capturing sensor 404 to identify that there is a passenger other than the driver. The seat other than the driver can detect weight for the capturing sensor 404 to identify that there is a passenger other than the driver.

The capturing sensor 404 can constantly monitor the inside, the outside, or a combination thereof to capture the vehicle manipulation 414 by the passenger other than the driver in real time. For further example, the capturing sensor 404 can transmit the vehicle manipulation 414 via the communication path 104 to the second control unit 534 to execute the provider module 602 to update the passenger presence 406 dynamically as the capturing sensor 404 detects the user, the passenger, or a combination thereof in real time. Based on the vehicle manipulation 414 captured, the provider module 602 can determine the occupancy status 416 of whether there are more than one passenger within the vehicle.

For a different example, the provider module 602 can determine the vehicle type 250. More specifically as an example, the vehicle type 250 can include environmentally friendly vehicle, non-environmentally friendly vehicle, or a combination thereof. For example, the environmentally friendly vehicle can include an electric vehicle, a hydrogen vehicle, a hybrid vehicle, a hydrogen fuel cell vehicle, a biofuel vehicle, or a combination thereof. The non-environmentally friendly vehicle can include a gasoline, diesel, or a combination thereof running vehicle. The provider module 602 can determine the vehicle type 250 based on a vehicle identification number, a model of vehicle, or a combination thereof.

For a different example, the provider module 602 can determine the traffic condition 224. More specifically as an example, the provider module 602 can determine the traffic condition 224 based on information provided by external sources including government Department of Transportation, other users of the navigation system 100 sharing the traffic information, third party commercial provider including media outlet, or a combination thereof.

The location unit 520 of FIG. 5 can receive the traffic condition 224 from the external sources dynamically in real time as the user with the first device 102 traverses the geographic area 202 of FIG. 2. For further example, the location unit 520 can transmit the traffic condition 224 via the communication path 104 to the second control unit 534 to execute the provider module 602 to update the traffic condition 224 dynamically as the location unit 520 receives the traffic condition 224 in real time.

For a different example, the provider module 602 can determine the travel information 212. The provider module 602 can determine the travel information 212 based on the geographic area 202. More specifically as an example, the geographic area 202 can include the current location 208 of FIG. 2 of the first device 102 of FIG. 1, the waypoint 210 of FIG. 2 the user is planning to travel to, or a combination thereof.

The geographic area 202 can include the thoroughfare 204 of FIG. 2 connecting one instance of the geographic location to another instance of the geographic location. The external sources including the government Department of Transportation, other users of the navigation system 100, third party commercial provider including media outlet, or a combination thereof can share attributes of the geographic area 202. For example, the thoroughfare 204 can include the lane type 216 of FIG. 2 having the time restriction 214 of FIG. 2. Based on the geographic area 202, the provider module 602 can determine the travel information 212.

The provider module 602 can determine the source data 402 based on a combination of various factors discussed above. The provider module 602 can transmit the source data 402 to an availability module 604.

The navigation system 100 can include the availability module 604, which can be coupled to the provider module 602. The availability module 604 determines the lane availability 222 of FIG. 2. For example, the availability module 604 can determine the lane availability 222 based on the current location 208, the travel information 212, the time information 218 of FIG. 2, the lane type 216, or a combination thereof.

The availability module 604 can determine the lane availability 222 in a number of ways. For example, the availability module 604 can determine the lane availability 222 based on the travel information 212. The travel information 212 can include the time restriction 214 for the lane type 216 of the thoroughfare 204. The availability module 604 can determine whether the lane availability 222 for the lane type 216 representing the HOV lane is available or not within the time restriction 214 for the geographic area 202.

For another example, the availability module 604 can determine the lane availability 222 based on the current location 208 of the first device 102 at the given instance of the time information 218. The time information 218 can represent current time where the current location 208 is detected. In combination of the travel information 212, the availability module 604 can determine whether the lane availability 222 for the lane type 216 is available or not for where the current location 208 is detected.

The location unit 520 can receive the travel information 212 from the external sources dynamically in real time as the user with the first device 102 traverses the geographic area 202. For further example, the location unit 520 can transmit the travel information 212 via the communication path 104 to the second control unit 534 to execute the availability module 604 to update the lane availability 222 dynamically as the location unit 520 receives the travel information 212 in real time. The availability module 604 can transmit the lane availability 222 to a notification module 606.

The navigation system 100 can include the notification module 606, which can be coupled to the availability module 604. The notification module 606 generates the access notification 304 of FIG. 3. For example, the notification module 606 can generate the access notification 304 based on the current location 208, the lane availability 222, the occupancy status 416, the travel information 212, the vehicle type 250, the government law 220 of FIG. 2, or a combination thereof.

The notification module 606 can generate the access notification 304 in a number of ways. For example, the notification module 606 can generate the access notification 304 including various instances of the notice type 306 of FIG. 3. The notice type 306 can include the audio notification 308 of FIG. 3, the visual notification 310 of FIG. 3, or a combination thereof.

The audio notification 308 can include the audio prompt 312 of FIG. 3, the audio sound 314 of FIG. 3, or a combination thereof. The visual notification 310 can include the visual prompt 316 of FIG. 3, the visual cue 318 of FIG. 3, or a combination thereof to be displayed on the display interface 206 of FIG. 2. The audio notification 308, the visual notification 310, or a combination thereof can include the HOV notification 320 of FIG. 3, the commercial vehicle lane notification 322 of FIG. 3, the lane type notification 324 of FIG. 3, the toll notification 326 of FIG. 3, the departure notification 328 of FIG. 3, or a combination thereof.

The notification module 606 can generate the access notification 304 based on the lane availability 222, the occupancy status 416, or a combination thereof. For example, as discussed above, the occupancy status 416 can indicate that the vehicle can include a passenger other than the driver. The lane availability 222 can indicate that the lane type 216 representing the HOV lane is available for the thoroughfare 204. As a result, the notification module 606 can generate the access notification 304 representing the HOV notification 320.

Continuing with the example, the notification module 606 can generate the HOV notification 320 including the audio notification 308, the visual notification 310, or a combination thereof to be presented to the user in the vehicle via the vehicle sound system, the display interface 206, or a combination thereof. If the HOV lane is available, the notification module 606 can generate the audio prompt 312 representing an audio message indicating that HOV lane is available for the current location 208, the waypoint 210, or a combination thereof. For further example, the notification module 606 can generate the audio sound 314 specifically tailored for particular instance of the lane type 216 is available to differentiate from other instances of the notice type 306.

For additional example, if the HOV lane is available, the notification module 606 can generate the visual notification 310 representing a visual message indicating that HOV lane is available for the current location 208, the waypoint 210, or a combination thereof. For further example, the notification module 606 can generate the visual cue 318. The visual cue 318 can represent non-textual information to be displayed on the display interface 206, specifically tailored for if the particular instance of the lane type 216 is available.

For further example, the notification module 606 can generate the access notification 304 based on the current location 208 entering, exiting, or a combination thereof the HOV lane. More specifically as an example, the notification module 606 can generate the access notification 304 prior to entering the HOV lane to inform that the user is entering the HOV lane in real time. Subsequently, the notification module 606 can generate the access notification 304 at the exit or after exiting the HOV lane in real time.

The location unit 520 can receive the travel information 212 from the external sources dynamically and the lane availability 222 in real time as the user with the first device 102 traverses the geographic area 202. For further example, the travel information 212, the lane availability 222, or a combination thereof can be transmitted via the communication path 104 to the second control unit 534 to execute the notification module 606 to update the access notification 304 dynamically and in real time.

For a specific example, the HOV lane can be no longer be available to due to the time restriction 214. Once the location unit 520 receives the travel information 212 regarding the change in the lane availability 222, the lane availability 222 can be transmitted to the notification module 606 to update the access notification 304 dynamically and in real time to inform the user regarding the HOV lane being unavailable. More specifically as an example, the notification module 606 can update the audio notification 308, the visual notification 310, or a combination thereof dynamically and in real time to change the content that the HOV lane is no longer available prior to the user reaching the thoroughfare 204 with the lane type 216 representing the HOV lane.

It has been discovered that the navigation system 100 dynamically updating the access notification 304 in real time significantly improves the performance of the navigation system 100 to accurately inform the user of the lane availability 222. By constantly monitoring the travel information 212 including the time restriction 214 of the lane type 216, the navigation system 100 can transmit the lane availability 222 to notify the user via the access notification 304. As a result, the navigation system 100 can improve the safety of the user by improving the performance of the navigation system 100 to accurately deliver the lane availability 222.

For further example, the capturing sensor 404 can capture the passenger presence 406 dynamically and in real time. As discussed above, the capturing sensor 404 can constantly monitor the inside, the outside, or a combination thereof of the vehicle to identify the passenger presence 406 other than the driver. The occupancy status 416 determined based on the passenger presence 406 can be transmitted via the communication path 104 to the second control unit to execute the notification module 606 to update the access notification 304 dynamically and in real time.

More specifically as an example, the notification module 606 can compare the occupancy status 416 dynamically and in real time to the government law 220 to determine whether the user can use the HOV lane. If the occupancy status 416 is below the number of passengers required by the government law 220, the notification module 606 can update dynamically and in real time the access notification 304 to inform the user that the vehicle is no longer allowed to use the HOV lane. In contrast, if the occupancy status 416 meets or exceeds the number of passengers required by the government law 220, the notification module 606 can update dynamically and in real time the access notification 304 to inform the user that the vehicle is allowed to use the HOV lane.

It has been discovered that the navigation system 100 dynamically updating the access notification 304 in real time significantly improves the performance of the navigation system 100 to accurately inform the user of the lane availability 222. By constantly monitoring the passenger presence 406, the navigation system 100 can compare the occupancy status 416 to the government law 220 in real time to determine whether the user can legally use the lane type 216. As a result, the navigation system 100 can improve the safety of the user by improving the performance of the navigation system 100 to accurately deliver the lane availability 222 via the access notification 304.

For a different example, the notification module 606 can generate the commercial vehicle lane notification 322 based on the travel information 212, the current location 208, or a combination thereof. More specifically as an example, according to the travel information 212, the thoroughfare 204 can include the lane type 216 only for commercial vehicle including a commercial bus, a taxi, a commercial truck, or a combination thereof. Based on the current location 208 and the waypoint 210 where the user is heading, the notification module 606 can generate the commercial vehicle lane notification 322 to indicate that geographic area 202 that is traveled or will be traveled by the user will include the lane type 216 unavailable for non-commercial vehicle.

For another example, the notification module 606 can generate the lane type notification 324. More specifically as an example, the lane type notification 324 can include the access notification 304 for specific instance of the lane type 216. The lane type 216 can include "right lane only," "left lane only," "exit only lane," "one way," or a combination thereof. Based on the current location 208, the waypoint 210, the travel information 212, or a combination thereof, the notification module 606 can generate the lane type notification 324 to inform the user that the lane type 216 on the thoroughfare 204 may be restricted as the user progresses on the thoroughfare 204.

For a different example, the notification module 606 can generate the toll notification 326. The toll notification 326 can include the access notification 304 for variety of tolls or payment opportunities. For example, the toll or payment opportunity can include toll plaza, electronic toll collection system, or a combination thereof that allows driver to pay the toll manually, electronically, or a combination thereof while traveling on the thoroughfare 204. Based on the current location 208, the waypoint 210, the travel information 212, or a combination thereof, the notification module 606 can generate the toll notification 326 to inform the user that the thoroughfare 204 that requires payment to continue traveling on the thoroughfare 204 at the waypoint 210, to travel on the specific instance of the lane type 216 on the thoroughfare 204, or a combination thereof.

The location unit 520 can receive the travel information 212 from the external sources dynamically and the change in the toll fare 332 of FIG. 3 in real time as the user with the first device 102 traverses the geographic area 202. For further example, the travel information 212 regarding the change in the toll fare 332 can be transmitted via the communication path 104 to the second control unit 534 to execute the notification module 606 to update the access notification 304 dynamically and in real time.

For a specific example, the toll fare 332 can change dynamically depending on the time of the day, the traffic condition 224, or a combination thereof. Once the location unit 520 receives the travel information 212 regarding the change in the toll fare 332, the travel information 212 can be transmitted to the notification module 606 to update the access notification 304 dynamically and in real time to inform the user regarding the change in the toll fare 332. More specifically as an example, the notification module 606 can update the audio notification 308, the visual notification 310, or a combination thereof dynamically and in real time to change the content that the toll fare 332 has changed prior to the user reaching the thoroughfare 204 that requires the toll fare 332.

It has been discovered that the navigation system 100 dynamically updating the toll notification 326 in real time significantly improves the performance of the navigation system 100 to accurately inform the user of the lane availability 222. By constantly monitoring the travel information 212 including the toll fare 332 of the lane type 216, the navigation system 100 can transmit the toll fare 332 to notify the user via the toll notification 326. As a result, the navigation system 100 can improve the safety of the user by improving the performance of the navigation system 100 to accurately deliver the toll fare 332 to allow the user to decide in real time whether to use the lane type 216 or not.

For a different example, the notification module 606 can generate the departure notification 328. Based on the time restriction 214 placed on the thoroughfare 204, the notification module 606 can generate the departure notification 328 to suggest the time information 218 for ideal time for the user to travel on the thoroughfare 204. For example, the ideal time can base on the user preference 330 of FIG. 3.

More specifically as an example, if the user preference 330 indicates the preference for reducing financial cost, the notification module 606 can generate the departure notification 328 where the time restriction 214 for the thoroughfare 204 no longer applies. The time restriction 214 can indicate the specific instance of the time information 218 for when the thoroughfare 204 is restricted with monetary cost for HOV lane use. As a result, the notification module 606 can generate the departure notification 328 based on the current location 208, the time restriction 214, the time information 218 to suggest traveling on the thoroughfare 204 when the user does not incur financial cost.

The location unit 520 can receive the travel information 212 from the external sources dynamically and the change in the time restriction 214 in real time as the user with the first device 102 traverses the geographic area 202. For further example, the travel information 212, the time restriction 214, or a combination thereof can be transmitted via the communication path 104 to the second control unit 534 to execute the notification module 606 to update the access notification 304 dynamically and in real time.

For a specific example, the time restriction 214 can change dynamically depending on the time information 218, the traffic condition 224, or a combination thereof. Once the location unit 520 receives the travel information 212 regarding the change in the time restriction 214, the travel information 212 can be transmitted to the notification module 606 to update the access notification 304 dynamically and in real time to inform the user regarding the change in the time restriction 214. More specifically as an example, the notification module 606 can update the audio notification 308, the visual notification 310, or a combination thereof dynamically and in real time to change the content that the time restriction 214 has changed prior to the user reaching the thoroughfare 204 that requires the toll fare 332.

The notification module 606 can generate a variety of different instances of the access notification 304 discussed above in combination to be presented to the user. The notification module 606 can transmit the access notification 304 generated to a route module 608.

The navigation system 100 can include the route module 608, which can be coupled to the notification module 606. The route module 608 generates a route. For example, the route module 608 can generate the travel route 230 of FIG. 2, the ride share route 232 of FIG. 2, or a combination thereof based on the ride share request 236 of FIG. 2, the lane availability 222, the time restriction 214, the time information 218, the occupancy status 416, the ride share availability 238 of FIG. 2, the pickup location 234 of FIG. 2, or a combination thereof.

The route module 608 can generate the route in a number of ways. For example, the ride share request 236 can indicate that the user desires to use the lane type 216 representing the HOV lane. The lane availability 222 indicates that the HOV lane is available within the time restriction 214, the time information 218, or a combination thereof of when the user is traveling the thoroughfare 204.

Continuing with the example, the occupancy status 416 can indicate that the user's vehicle is currently below the number of passengers required by the government law 220 to use the HOV lane without monetary cost. The route module 608 can execute the first communication unit 516 of FIG. 5 to transmit the ride share request 236 dynamically and in real time via the communication path 104 to the other user of the navigation system 100 who has indicated the ride share availability 238 of "available." The first communication unit 516 can receive the ride share availability 238 including the pickup location 234 for the route module 608 to compare in real time one instance of the ride share availability 238 to another instance of the ride share availability 238 to select the pickup location 234 most optimal to the user, the other passenger, or a combination thereof for generating the ride share route 232.

More specifically as an example for most optimal, the route module 608 can select the pickup location 234 according to the shortest instance of the travel duration 228, the shortest instance of the travel distance 226, the least fuel consumption, the least monetary cost, the least traffic jam for the traffic condition 224, the familiarity of the geographic area 202 with least safety concern, or a combination thereof. The route module 608 can reevaluate the above factor each time dynamically and in real time after each selection of the pickup location 234 is made and prior to the subsequent selection of the pickup location 234. As a result, the route module 608 can update the ride share route 232 to include the pickup location 234 for the driver to pick up the other passenger to take advantage of the HOV lane. For example, the route module 608 can generate the ride share route 232 that connects instances of the thoroughfare 204 connecting from the current location 208, one instance of multiple instances of the pickup location 234, the waypoint 210, or a combination thereof.

It has been discovered that the navigation system 100 dynamically updating the ride share route 232 in real time significantly improves the performance of the navigation system 100 to accurately guide the user to the pickup location 234, the waypoint 210, or a combination thereof. By constantly monitoring the ride share availability 238, the navigation system 100 can transmit the generate the ride share route 232 most optimal for the user, the passenger, or a combination thereof. As a result, the navigation system 100 can improve the safety of the user, the passenger, or a combination thereof by improving the performance of the navigation system 100 to generate the ride share route 232 with minimum resource utilized by the navigation system 100.

The route module 608 can generate the travel route 230. The occupancy status 416 of the vehicle can be only the driver without any other passengers. As a result, the route module 608 can generate the travel route 230 from the current location 208 to the waypoint 210 based on the lane availability 222, the time restriction 214, the time information 218, or a combination thereof. More specifically as an example, the travel route 230 can include the lane type 216 of the HOV lane, non-HOV lane, or a combination thereof. The route module 608 can transmit the travel route 230, the ride share route 232, or a combination thereof to a fee module 610.

The navigation system 100 can include the fee module 610, which can be coupled to the route module 608. The fee module 610 calculates the ride share fee 240 of FIG. 2. For example, the fee module 610 can calculate the ride share fee 240 based on the pickup location 234, the ride share route 232, the traffic condition 224, the travel distance 226 of FIG. 2, the travel duration 228 of FIG. 2, or a combination thereof.

For a specific example, the fee module 610 can calculate the ride share fee 240 based on where the other passenger was picked up, how long was the travel from the pickup location 234 to the waypoint 210, and the travel duration 228 required for the travel, or a combination thereof. For further example, the fee module 610 can calculate additional cost based on the severity of the traffic condition 224 in addition to the ride share fee 240. More specifically as an example, the severity of the traffic condition 224 can represent "moderate," "heavy," or "stand still" with "moderate" representing light traffic while "stand still" representing the traffic condition 224 where vehicles are not moving forward beyond a predefined distance within a predefined time period.

More specifically as an example, the location unit 520 can receive the traffic condition 224 from the external sources dynamically in real time as the user with the first device 102 traverses the geographic area 202. For further example, the location unit 520 can transmit the traffic condition 224 via the communication path 104 to the second control unit 534 to execute the fee module 610 to update the ride share fee 240 dynamically as the location unit 520 receives the traffic condition 224 in real time. The fee module 610 can transmit the ride share fee 240, the additional cost, or a combination thereof to an estimation module 612.

It has been discovered that the navigation system 100 dynamically updating the ride share fee 240 in real time significantly improves the performance of the navigation system 100 to accurately inform the user, the passenger, or a combination thereof of the estimate of the monetary cost for the travel. By constantly monitoring the traffic condition 224, the navigation system 100 can transmit the ride share fee 240 in real time. As a result, the navigation system 100 can improve the safety of the user by improving the performance of the navigation system 100 to accurately deliver the ride share fee 240 with minimum burden to the navigation system 100.

The navigation system 100 can include the estimation module 612, which can be coupled to the fee module 610. The estimation module 612 generates the arrival estimation 242 of FIG. 2. For example, the estimation module 612 can generate the arrival estimation 242 based on the occupancy status 416, the current location 208, the waypoint 210, the lane availability 222, the traffic condition 224, the ride share route 232, or a combination thereof.

The estimation module 612 can generate the arrival estimation 242 in a number of ways. For example, the arrival estimation 242 can include the estimation type 244 of FIG. 2 representing the carpool estimation 246 of FIG. 2, the single driver estimation 248 of FIG. 2, or a combination thereof.

For a specific example, the estimation module 612 can generate the carpool estimation 246. The occupancy status 416 can indicate that the vehicle can include a number of passengers meeting or exceeding the government law 220 to qualify to use the lane type 216 representing the HOV lane. The lane availability 222 can indicate that the lane type 216 representing the HOV lane is available on the thoroughfare 204. Based on traveling from the current location 208 to the waypoint 210 using the HOV lane under the traffic condition 224, the estimation module 612 can generate the carpool estimation 246 including the travel duration 228, the travel distance 226, or a combination thereof.

More specifically as an example, the estimation module 612 can generate the carpool estimation 246 based on the ride share route 232. For example, the estimation module 612 can generate the arrival estimation 242 for each instance of the pickup location 234 where the driver needs to pick up the other passenger. For additional example, the estimation module 612 can generate the arrival estimation 242 in real time for each instance of the waypoint 210 that the driver, the other passenger, or a combination thereof is planning to reach. By aggregating each instances of the arrival estimation 242, the estimation module 612 can generate the carpool estimation for the ride share route 232.

Based on traveling from the current location 208 to the waypoint 210 using the HOV lane under the traffic condition 224, the estimation module 612 can generate the carpool estimation 246 including the travel duration 228, the travel distance 226, or a combination thereof. For another example, the estimation module 612 can generate the carpool estimation 246 based on the travel duration 228, the travel distance 226, or a combination thereof without using the HOV lane under the traffic condition 224.

The location unit 520 can receive the traffic condition 224 from the external sources dynamically in real time as the user with the first device 102 traverses the geographic area 202. For further example, the location unit 520 can transmit the traffic condition 224 via the communication path 104 to the second control unit 534 to execute the estimation module 612 to update the arrival estimation 242 dynamically as the location unit 520 receives the traffic condition 224 in real time.

For additional example, as discussed above, the passenger presence 406 is constantly monitored to determine the occupancy status 416 meets or exceeds the number required by the government law 220. The occupancy status 416 can be transmitted via the communication path 104 to the second control unit to execute the estimation module 612 to update the arrival estimation 242 dynamically and in real time to reflect whether the user can continue using the ride share route 232 traversing the HOV lane. If not, the estimation module 612 can generate arrival estimation 242 dynamically and in real time for a travel without traversing the HOV lane based on the occupancy status 416 below the number of passengers required by the government law 220.

It has been discovered that the navigation system 100 dynamically updating the carpool estimation 246 in real time significantly improves the performance of the navigation system 100 to accurately inform the arrival estimation 242. By constantly monitoring the passenger presence 406, the navigation system 100 can transmit the occupancy status 416 to update the carpool estimation 246 in real time. As a result, the navigation system 100 can improve the safety of the user by improving the performance of the navigation system 100 to accurately deliver the carpool estimation 246 to inform when the user, the passenger, or a combination thereof can arrive at the pickup location 234, the waypoint 210, or a combination thereof.

For additional example, the estimation module 612 can generate the single driver estimation 248. The occupancy status 416 can indicate that the there is only one passenger in the vehicle. As a result, the driver may not be able to use the HOV lane. Based on traveling from the current location 208 to the waypoint 210 without using the HOV lane under the traffic condition 224, the estimation module 612 can generate the single driver estimation 248 including the travel duration 228, the travel distance 226, or a combination thereof.

The estimation module 612 can generate the carpool estimation 246, the single driver estimation 248, or a combination thereof to be presented in combination to the user. Details will be discussed below. The estimation module 612 can transmit the arrival estimation 242 including the carpool estimation 246, the single driver estimation 248, or a combination thereof to a navigation module 614.

The navigation system 100 can include the navigation module 614, which can be coupled to the estimation module 612. The navigation module 614 generates the navigation guidance 302. For example, the navigation module 614 can generate the navigation guidance 302 based on the ride share route 232, the travel route 230, the lane type 216, the lane availability 222, the notice type 306, or a combination thereof.

The navigation module 614 can generate the navigation guidance 302 in a number of ways. For example, the navigation module 614 can generate the navigation guidance 302 based on the ride share route 232. As discussed above, the ride share route 232 can include the thoroughfare 204 or instances of the thoroughfare 204 connecting from the current location 208, the pickup location 234, the waypoint 210, or a combination thereof. For a different example, the navigation module 614 can generate the navigation guidance 302 including the travel route 230 from the current location 208 to the waypoint 210 traversing the thoroughfare 204.

For another example, the navigation module 614 can generate the navigation guidance 302 including the access notification 304 to inform the user of the first device 102. More specifically as an example, the access notification 304 can include the audio notification 308, the visual notification 310, or a combination thereof. For further example, the navigation module 614 can update the navigation guidance 302 dynamically and in real time based on the changes in the traffic condition 224, the occupancy status 416, the arrival estimation 242, the travel information 212, the lane availability 222, or a combination thereof as discussed above.

Continuing with the example, the access notification 304 can include the travel route 230, the ride share route 232, or a combination thereof to be presented to the user. More specifically as an example, the visual notification 310, the audio notification 308, or a combination thereof can include the travel route 230, the ride share route 232, or a combination thereof to be presented to the user, the passenger, or a combination thereof to reach the waypoint 210.

For example, the navigation module 614 can generate the audio notification 308, the visual notification 310, or a combination thereof including the lane type 216 that the driver can traverse on the thoroughfare 204 in real time. More specifically as an example, the navigation module 614 can generate the navigation guidance 302 to inform the user the lane availability 222 of the lane type 216 based on the current location 208, the waypoint 210, the time restriction 214, the time information 218, or a combination thereof in real time. The navigation module 614 can transmit the navigation guidance 302 to a display module 616.

The navigation system 100 can include the display module 616, which can be coupled to the navigation module 614. The display module 616 presents the content to the user. For example, the display module 616 can present the navigation guidance 302, the access notification, the geographic area 202, the traffic condition 224, the travel information 212, the lane type 216, the lane availability 222, the current location 208, the waypoint 210, the thoroughfare 204, the passenger presence 406, or a combination thereof on the display interface 206.

The display module 616 can present the content in a number of ways. For example, the display module 616 can transform the physical aspect of the physical world into a digital representation to be displayed on the display interface 206. For a specific example, the display module 616 can display the current location 208 of the user represented by the visual cue 318. Moreover, the display module 616 can transform the physical world into a digital representation of the geographic area 202 including the thoroughfare 204 to display the current location 208 changing dynamically and in real time to reflect the user traversing the physical world. Additionally, the display module 616 can transform the direction from the current location 208 to the waypoint 210 in the physical world into the digital representation of the ride share route 232, the travel route 230, or a combination thereof to display the visual cue 318 traversing in real time.

For further example, the display module 616 can transform the time restriction 214 placed on the lane availability 222 for the lane type 216 in the physical world into a digital representation on the display interface 206 to inform the user of the changes in the physical world dynamically and in real time. As discussed above, the lane availability 222 can change based on the time restriction 214 placed on the time information 218. As the time information 218 changes, the time restriction 214 placed on the lane type 216 changes. The display module 616 can present the updated instance of the lane availability 222 in the form of the audio notification 308, the visual notification 310, or a combination thereof to reflect the changes and inform the user of the changes in the physical world.

For further example, the display module 616 can transform the occupancy status 416 based on the passenger presence 406 identified to reflect the changes occurring in the physical world. As discussed above, the passenger presence 406 including the passenger image 408, the biometric information 410, the passenger voice 412, the vehicle manipulation 414, or a combination thereof are constantly monitored for detection. As the passenger presence 406 changes in the physical world, the changes are processed and analyzed for the display module 616 to present the changes in the digital representation of what have occurred in the physical world. More specifically as an example, if the occupancy status 416 changes due to changes in the passenger presence 406, the display module 616 can update the navigation guidance 302 including the access notification 304 to inform whether the user can use the lane type 216 or not.

The physical transformation from traveling from the current location 208 to the waypoint 210 results in the movement in the physical world, such as people using the first device 102, the vehicle, or a combination thereof, based on the operation of the navigation system 100. As the movement in the physical world occurs, the movement itself creates additional information that is converted back into determining the source data 402, determining the lane availability 222, generating the access notification 304, generating the route, generating the arrival estimation 242, generating the navigation guidance 302, or a combination thereof for the continued operation of the navigation system 100 and to continue the movement in the physical world.

The first software 526 of FIG. 5 of the first device 102 of FIG. 5 can include the modules for the navigation system 100. The first software 526 can include the provider module 602, the availability module 604, the notification module 606, the route module 608, the fee module 610, the estimation module 612, the navigation module 614, and the display module 616.

The first control unit 512 of FIG. 5 can execute the first software 526 for executing the provider module 602 to determine and provide the source data 402. The first control unit 512 can execute the first software 526 for executing the availability module 604 to determine the lane availability 222. The first control unit 512 can execute the first software 526 for executing the notification module 606 to generate the access notification 304.

The first control unit 512 can execute the first software 526 for executing the route module 608 to generate the route. The first control unit 512 can execute the first software 526 for executing the fee module 610 to calculate the ride share fee 240. The first control unit 512 can execute the first software 526 for executing the estimation module 612 to generate the arrival estimation 242. The first control unit 512 can execute the first software 526 for executing the navigation module 614 to generate the navigation guidance 302. The first control unit 512 can execute the first software 526 for executing the display module 616 to present the content.

The second software 542 of FIG. 5 of the second device 106 of FIG. 5 can include the modules for the navigation system 100. The second software 542 can include the provider module 602, the availability module 604, the notification module 606, the route module 608, the fee module 610, the estimation module 612, the navigation module 614, and the display module 616.

The second control unit 534 of FIG. 5 can execute the second software 542 for executing the provider module 602 to determine and provide the source data 402. The second control unit 534 can execute the second software 542 for executing the availability module 604 to determine the lane availability 222. The second control unit 534 can execute the second software 542 for executing the notification module 606 to generate the access notification 304.

The second control unit 534 can execute the second software 542 for executing the route module 608 to generate the route. The second control unit 534 can execute the second software 542 for executing the fee module 610 to calculate the ride share fee 240. The second control unit 534 can execute the second software 542 for executing the estimation module 612 to generate the arrival estimation 242. The second control unit 534 can execute the second software 542 for executing the navigation module 614 to generate the navigation guidance 302. The second control unit 534 can execute the second software 542 for executing the display module 616 to present the content.

The modules of the navigation system 100 can be partitioned between the first software 526 and the second software 542. The second software 542 can include the provider module 602, the availability module 604, the notification module 606, the route module 608, the fee module 610, the estimation module 612, and the navigation module 614. The second control unit 534 can execute the modules partitioned on the second software 542 as previously described.

The first software 526 can include the display module 616. Based on the size of the first storage unit 514, the first software 526 can include additional modules of the navigation system 100. The first control unit 512 can execute the modules partitioned on the first software 526 as previously described.

The first control unit 512 can operate the first communication unit 516 of FIG. 5 to communicate the source data 402, the lane availability 222, the access notification 304, the route, the ride share fee 240, the arrival estimation 242, the navigation guidance 302, or a combination thereof to or from the second device 106 through the communication path 104. The first control unit 512 can operate the first software 526 to operate the location unit 520. The second control unit 534 can operate the second communication unit 536 of FIG. 5 to communicate the source data 402, the lane availability 222, the access notification 304, the route, the ride share fee 240, the arrival estimation 242, the navigation guidance 302, or a combination thereof to or from the first device 102 through the communication path 104.

The first control unit 512 can operate the first user interface 518 of FIG. 5 represented as the display interface 206 to present the digital representation of the source data 402, the lane availability 222, the access notification 304, the route, the ride share fee 240, the arrival estimation 242, the navigation guidance 302, or a combination thereof. The second control unit 534 can operate the second user interface 538 of FIG. 5 represented as the display interface 206 to present the digital representation of the source data 402, the lane availability 222, the access notification 304, the route, the ride share fee 240, the arrival estimation 242, the navigation guidance 302, or a combination thereof.

The navigation system 100 describes the module functions or order as an example. The modules can be partitioned differently. For example, the provider module 602 and the availability module 604 can be combined. Each of the modules can operate individually and independently of the other modules. Furthermore, data generated in one module can be used by another module without being directly coupled to each other. For example, the notification module 606 can receive the source data 402 from the provider module 602. Further, "communicating" can represent sending, receiving, or a combination thereof the data generated to or from one to another.

The modules described in this application can be hardware implementation or hardware accelerators in the first control unit 512 or in the second control unit 534. The modules can also be hardware implementation or hardware accelerators within the first device 102 or the second device 106 but outside of the first control unit 512 or the second control unit 534, respectively.

The modules described in this application can be implemented as instructions stored on a non-transitory computer readable medium to be executed by the first control unit 512, the second control unit 534, or a combination thereof. The non-transitory computer medium can include the first storage unit 514 of FIG. 5, the second storage unit 546 of FIG. 5, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 7:
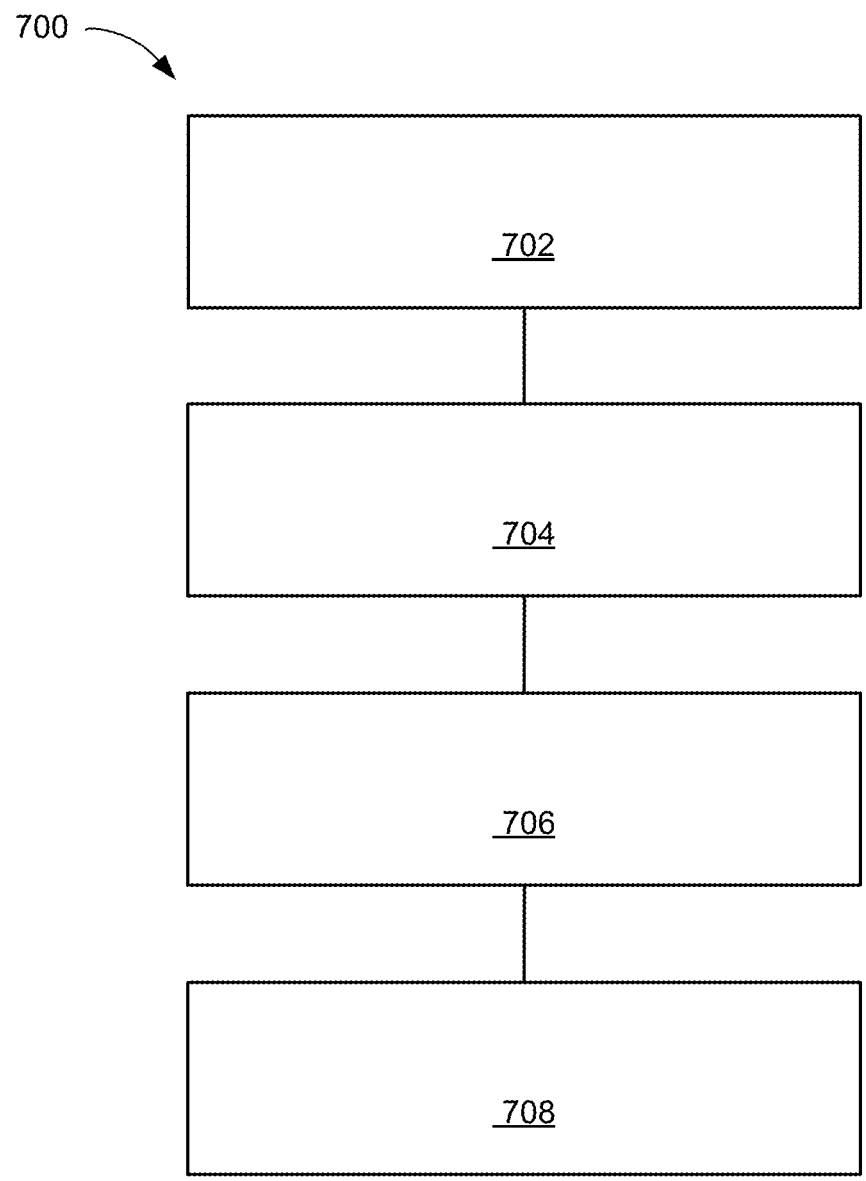
FIG. 7 is a flow chart of a method of operation of the navigation system in a further embodiment of the present invention.

Referring now to FIG. 7, therein is shown a flow chart of a method 700 of operation of the navigation system 100 in a further embodiment of the present invention. The method 700 includes: determining an occupancy status with a capturing sensor based on detecting a passenger presence in real time in a block 702; determining a lane availability of a lane type based on a current location in a block 704; generating an access notification based on the occupancy status, the lane availability for traversing on the lane type in a block 706; and updating the access notification with a control unit dynamically and in real time based on a change in the occupancy status, the lane availability, or a combination thereof for presenting on a device in block 708.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   determining an occupancy status with a capturing sensor based on detecting a passenger presence in real time;
   receiving a ride share availability representing a status of availability to share a ride based on the occupancy status;
   selecting a pickup location based on the ride share availability, a travel duration, a travel distance, a traffic condition, or a combination thereof;
   determining a lane availability of a lane type based on a current location;
   generating multiple instances of an access notification including various instances of a notice type based on the occupancy status, the lane availability, or a combination thereof to differentiate one instance of the notice type from another for traversing on the lane type;
   updating the access notification with a control unit dynamically and in real time based on a change in the occupancy status, the lane availability, or a combination thereof; and
   generating a carpool estimation including an approximate time for stopping by the pickup location prior to reach a waypoint for presenting on a device.

2. The method as claimed in claim 1 further comprising updating the occupancy status dynamically and in real time based on a change in the passenger presence detected.

3. The method as claimed in claim 1 wherein determining the occupancy status includes determining the occupancy status based on a passenger presence including a passenger image, a biometric information, or a combination thereof detected.

4. The method as claimed in claim 1 wherein updating the access notification includes updating the access notification based on comparing the occupancy status to a government law dynamically in real time for determining whether the lane type is traversable.

5. The method as claimed in claim 1 wherein updating the access notification includes updating a toll notification dynamically and in real time based on a change in a toll fare for presenting on the device.

6. The method as claimed in claim 1 further comprising generating a ride share route based on the ride share availability for selecting the pickup location to include in the ride share route.

7. The method as claimed in claim 1 further comprising transmitting a ride share request based on the occupancy status for selecting the pickup location to include in a ride share route.

8. The method as claimed in claim 1 further comprising updating the carpool estimation dynamically and in real time based on the change in the occupancy status meeting or exceeding a government law.

9. The method as claimed in claim 1 wherein updating the access notification includes updating the access notification based on change in a time restriction placed on the lane type.

10. The method as claimed in claim 1 further comprising updating a ride share fee dynamically and in real time based on a change in the occupancy status.

11. A navigation system comprising:
    a control unit for:
        determining an occupancy status with a capturing sensor based on detecting a passenger presence in real time;
        receiving a ride share availability representing a status of availability to share a ride based on the occupancy status;
        selecting a pickup location based on the ride share availability, a travel duration, a travel distance, a traffic condition, or a combination thereof;
        determining a lane availability of a lane type based on a current location;
        generating multiple instances of an access notification including various instances of a notice type based on the occupancy status, the lane availability, or a combination thereof to differentiate one instance of the notice type from another for traversing on the lane type;
        updating the access notification with a control unit dynamically and in real time based on a change in the occupancy status, the lane availability, or a combination thereof;
        generating a carpool estimation including an approximate time for stopping by the pickup location prior to reach a waypoint; and
    a communication unit, coupled to the control unit, for transmitting the access notification, the carpool estimation, or a combination thereof for presenting on a device.

12. The navigation system as claimed in claim 11 wherein the control unit is for updating the occupancy status dynamically and in real time based on a change in the passenger presence detected.

13. The navigation system as claimed in claim 11 wherein the control unit is for determining the occupancy status based on a passenger presence including a passenger image, a biometric information, or a combination thereof detected.

14. The navigation system as claimed in claim 11 wherein the control unit is for updating the access notification based on comparing the occupancy status to a government law dynamically in real time for determining whether the lane type is traversable.

15. The navigation system as claimed in claim 11 wherein the control unit is for updating a toll notification dynamically and in real time based on a change in a toll fare for presenting on the device.

16. A non-transitory computer readable medium including instructions for execution, the instructions comprising:
    determining an occupancy status based on detecting a passenger presence in real time;
    receiving a ride share availability representing a status of availability to share a ride based on the occupancy status;
    selecting a pickup location based on the ride share availability, a travel duration, a travel distance, a traffic condition, or a combination thereof;
    determining a lane availability of a lane type based on a current location;
    generating multiple instances of an access notification including various instances of a notice type based on the occupancy status, the lane availability, or a combination thereof to differentiate one instance of the notice type from another for traversing on the lane type;
    updating the access notification dynamically and in real time based on a change in the occupancy status, the lane availability, or a combination thereof; and
    generating a carpool estimation including an approximate time for stopping by the pickup location prior to reach a waypoint for presenting on a device.

17. The non-transitory computer readable medium as claimed in claim 16 further comprising updating the occupancy status dynamically and in real time based on a change in the passenger presence detected.

18. The non-transitory computer readable medium as claimed in claim 16 wherein determining the occupancy status includes determining the occupancy status based on a passenger presence including a passenger image, a biometric information, or a combination thereof detected.

19. The non-transitory computer readable medium as claimed in claim 16 wherein updating the access notification includes updating the access notification based on comparing the occupancy status to a government law dynamically in real time for determining whether the lane type is traversable.

20. The non-transitory computer readable medium as claimed in claim 16 wherein updating the access notification includes updating a toll notification dynamically and in real time based on a change in a toll fare for presenting on the device.

\* \* \* \* \*